United States Patent
Macpherson et al.

(10) Patent No.: US 6,449,129 B1
(45) Date of Patent: Sep. 10, 2002

(54) DISC DRIVE RAMP WITH SHARP DETENT

(75) Inventors: Aaron Steve Macpherson, Fort Collins; Rick K. Thompson, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/607,346

(22) Filed: Jun. 30, 2000

Related U.S. Application Data

(60) Provisional application No. 60/141,617, filed on Jun. 30, 1999.

(51) Int. Cl.[7] .................................................. G11B 5/54
(52) U.S. Cl. ................................................... 360/254.8
(58) Field of Search ........................... 360/254.3–255.9

(56) References Cited

U.S. PATENT DOCUMENTS

| | | |
|---|---|---|
| 5,189,575 A | 2/1993 | Onooka et al. |
| 5,237,472 A | 8/1993 | Morehouse et al. |
| 5,408,375 A | 4/1995 | Asano |
| 5,526,206 A | 6/1996 | Shimizu |
| 5,585,980 A | 12/1996 | Boutaghou |
| 5,875,072 A | 2/1999 | Brooks, Jr. et al. |
| 5,973,887 A * | 10/1999 | Cameron ................. 360/254.8 |
| 6,292,333 B1 * | 9/2001 | Blumentritt .............. 360/254.8 |

* cited by examiner

*Primary Examiner*—A. J. Heinz
(74) *Attorney, Agent, or Firm*—Jennifer M. Buenzow

(57) ABSTRACT

The present invention provides for an improved ramp such that the head gimbal assemblies (HGAs) are prevented from moving off the ramp away from the discs. In a preferred embodiment, a ramp has a surface against which a load beam of a HGA rests when the HGA is in the unloaded position. The surface includes a sharp detent configured for retaining the load beam and thus preventing the load beam from sliding off the surface.

17 Claims, 3 Drawing Sheets

DISC DRIVE RAMP WITH SHARP DETENT

This patent application claims priority from U.S. Provisional Application No. 60/141,617, filed Jun. 30,1999.

FIELD OF THE INVENTION

The present invention relates generally to disc drives. More particularly, the present invention relates to an improved ramp for parking read/write heads.

BACKGROUND OF THE INVENTION

In ramp load disc drives, the head gimbal assembly (HGA) is parked on a ramp when the disc drive is not in operation, instead of being parked directly on the surface of the disc. The HGA needs to be kept on the ramp so that it will not accidentally unload onto the disc. If the ramp is located at the circumference of the disc, the HGA also needs to be kept from accidentally moving off the ramp away from the disc. This can sometimes be achieved by having a notch or an indent on the ramp, as shown in the U.S. Pat. No. 5,875,072 issued Feb. 23, 1999, to Brooks, Jr., et al for "Low profile head suspension assembly with load and unload capability" and in the U.S. Pat. No. 5,237,472 issued Aug. 17, 1993 to Morehouse et al. for "Rigid disc drive with dynamic head loading apparatus". There are, however, situations in which shallow notches may not be sufficient to keep the HGAs from moving off the ramp away from the disc.

For example, some disc drives designs include a latch for keeping the HGA from loading onto the disc when the disc drive is not in operation. The strength of the latch may vary from one disc drive to another, owing to variations in manufacturing tolerances. In some cases, the latch may be too strong and tend to pull the HGA off the ramp away from the disc. When the actuator is depopulated, that is when the read/write heads are removed from the actuator, and its mass is decreased, a similar problem surfaces, even with latches which are of the desired strength for a populated actuator. Such problems cannot be easily solved by decreasing the strength of the latch since that will increase the likelihood of the HGA moving off the ramp in the opposite direction to hit against the disc, thereby resulting in possibly irreparable damage.

The U.S. Pat. No. 5,742,453 entitled "Passive non-contact magnetic latch for an actuator of a disc drive" issued Apr. 21, 1998 to Macpherson describes a latch the strength of which is less dependable on manufacturing tolerances and may be used even in cases where the actuator is depopulated. However, this involves the use of an outer-diameter (OD) crash-stop to prevent the HGA from moving off the ramp by limiting the extent of rotation of the actuator as the latch will tend to pull the HGA off the ramp away from the disc. Therefore, during the manufacturing process, after the actuator has been installed and before the OD crash-stop is installed, there remains a need for an improved way of keeping the HGA on the ramp.

The present invention provides a solution to this and other problems, and offers other advantages over the prior art.

SUMMARY OF THE INVENTION

The present invention provides for an improved ramp such that the head gimbal assemblies (HGAs) are prevented from moving off the ramp away from the discs. In a preferred embodiment, a ramp has a surface against which a load beam of a HGA rests when the HGA is in the unloaded position. The surface includes a sharp detent configured for retaining the load beam and thus preventing the load beam from sliding off the surface.

In one embodiment, the surface includes a concave, depressed or indented portion ending in a generally vertical wall as it approaches the distal end of the ramp tooth. The distal end of the ramp tooth being the end that is designed to be further away from the disc when the ramp is assembled at the outer edge of a disc in a disc drive.

Alternatively, a top surface of a ramp tooth includes a slope leading down and towards the distal end to terminate in a generally vertical wall. In yet another embodiment, the top surface of a ramp tooth includes a step between the proximal portion of the top surface and a distal portion of the top surface such that the distal portion of the top surface is at a higher elevation that the proximal portion of the top surface.

These and various other features as well as advantages which characterize the present invention will be apparent upon reading of the following detailed description and review of the associated drawings.

DETAILED DESCRIPTION

Figure 1:
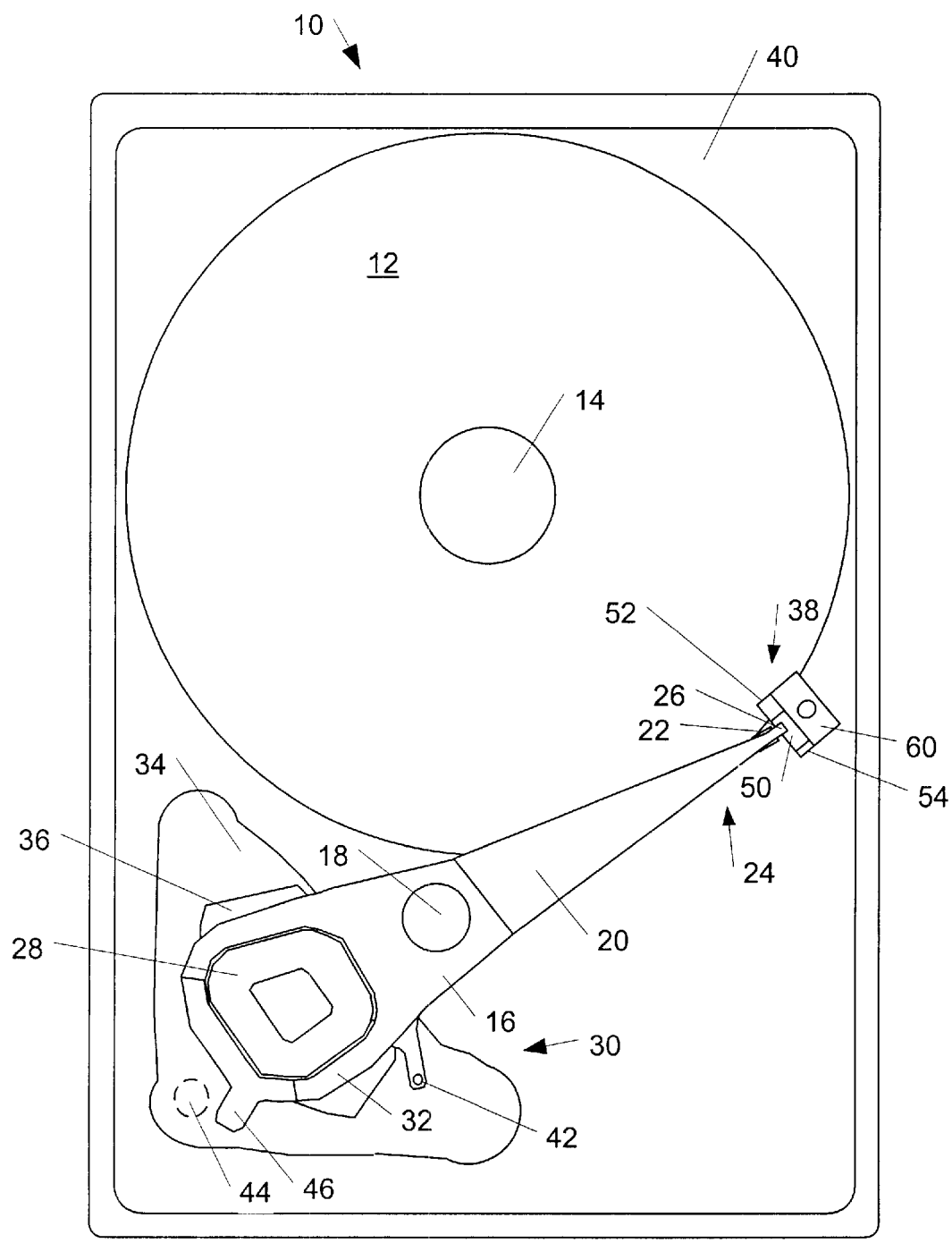
FIG. 1 is a top view of a disc drive.

A description of a most preferred embodiment of the present invention is given below for the purpose of illustration and should not be taken to be the only possible embodiment. Referring to FIG. 1, a disc drive 10 is shown with its cover removed to show at least one disc 12 mounted to a spindle motor 14 for rotation. At least one actuator 16 which is rotatable about a pivot 18 extends to an array of suspensions 20. At the end of each suspension is mounted a slider with read/write heads 22, thus forming a head gimbal assembly (HGA) 24. There is typically at least one HGA corresponding to each surface of the disc such that the array of read/write heads are arranged in opposing pairs. Extending from each HGA, generally in a direction away from the suspension, is a load beam. A voice coil 28 of a voice coil motor (VCM) 30 is attached to a yoke 32 which extends from the actuator in a direction generally opposite to the suspension. The voice coil is positioned between a lower VCM plate 34 and an upper VCM plate (not shown). At least one permanent magnet 36 is located between the lower VCM plate and the upper VCM plate.

A ramp 38 is mounted to the base 40 of the disc drive, at the edge of the disc, for parking the HGAs when the disc drive is not in operation. Each HGA may be held at the ramp by the load beam. A magnetic latch 42 is used to keep the HGAs from moving off the ramp towards the disc. The magnetic latch may be a pin or an extension from one side of the yoke. The pin is made of a ferromagnetic material so that it is attracted by the magnet of the VCM. To prevent the HGAs from being pulled off the ramp away from the discs by the magnetic latch, a crash-stop 44 may be used. The crash-stop may be in the form of a pin which is connected to the upper VCM plate. Thus, when the upper VCM plate is in the assembled position, a leg 46 extending from the yoke will come into abutment with the crash-stop before the actuator pivot to the extent where the HGAs leave the ramp. The ramp is configured such that, even in the situation where the crash-stop is not in position, the HGAs will be prevented from moving off the ramp away from the disc.

Figure 2:
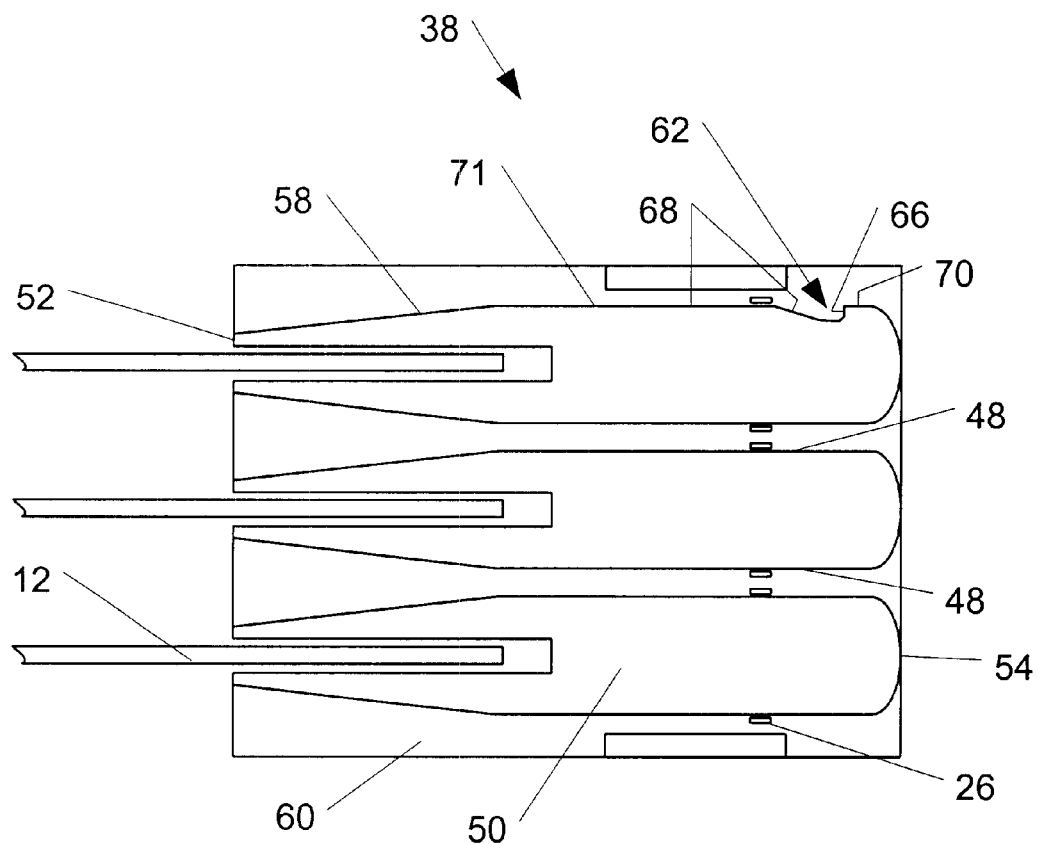
FIG. 2 is a cross-section showing a ramp of a preferred embodiment of the present invention.

A preferred embodiment of the ramp is further described with reference to FIG. 2. For the purpose of illustration, a ramp for a disc drive having three discs is illustrated diagrammatically in cross-section. The load beams are shown to be positioned by the sides or surfaces 48 of each ramp tooth. Each ramp tooth has at least one proximal end 52 leading to the disc and a distal end 54 which is further from the disc. Typically, the sides of the ramp tooth taper towards the proximal end to provide a gradient 58 along which the load beam may travel as the HGA is loaded. The gradient also serves to separate the opposing pairs of read/write heads so that they will not come into contact when held at rest by the ramp. The ramp may include a support 60 which provides for attachment to the base of the disc drive.

One of the ramp tooth includes a detent 62 which is configured to stop the load beam from sliding off the side of the ramp tooth away from the discs. In this manner the array of HGAs is prevented from moving off the ramp away from the discs. The detent is preferably formed by having a sharp transition from a proximal surface 68 to a distal surface 70 along a surface 48 of the ramp tooth. In one embodiment, the proximal surface develops into an inward slope forming part of a constriction at a side or surface 48 of the ramp tooth. Around the narrowest part of the constriction, the proximal surface 68 joins the distal surface 70 by a transition surface 66 which is shown in FIG. 2 as a generally vertical surface. This provides a surface for exerting a reaction force on the load beam if there is a force on the load beam directed generally away from the discs. At the same time, the present invention does not necessarily require an increase in the overall thickness of the ramp tooth or in the overall height of the ramp. This is an important advantage since disc drives are generally manufactured in standard sizes and the trend is towards making smaller disc drives. Most preferably, the transition wall is formed on the top surface 71 of the topmost ramp tooth.

Figure 3:
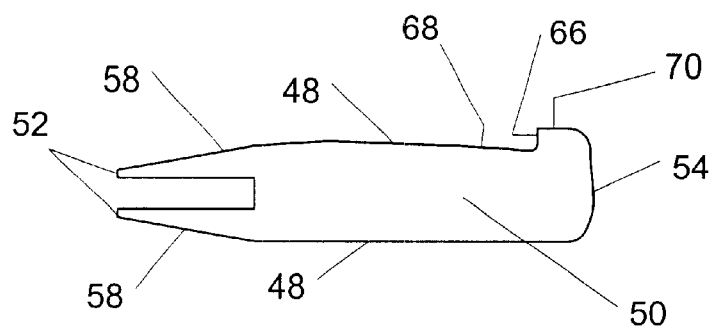
FIG. 3 shows an alternative embodiment of a ramp tooth according to the present invention.
Figure 4:
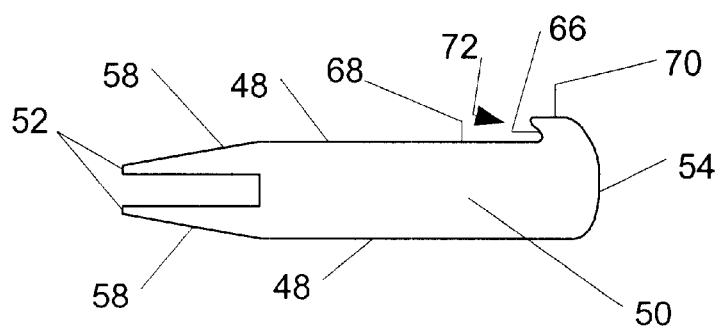
FIG. 4 shows another embodiment of a ramp tooth of the present invention.

In another embodiment, as shown in FIG. 3, one of the ramp teeth of the ramp has a distal surface that is at a different elevation with respect to the proximal surface. The proximal surface and the distal surface are joined by a generally vertical wall or by an inclined surface forming an acute angled notch 72, as shown in FIG. 4, such that the transition wall forms a detent.

The present invention has the advantage of being able to hold the HGA at the ramp, as the sharp detent will provide a counter-acting reaction force to the side-way force. The invention is also fairly easy to implement as it only involves modification of one of the ramp teeth, most preferably the top-most ramp tooth. No other fixtures and parts need to be manufactured and assembled within the already crowded disc drive. If it is required for the HGAs to be removed from the ramp, for example in the case of rework, the HGAs can be lifted out using a shipping comb or the like.

Figure 5:
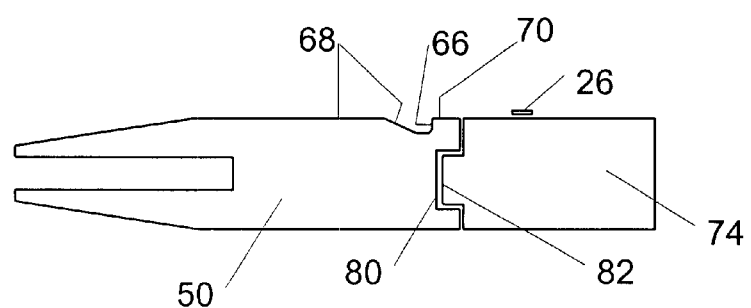
FIG. 5 illustrates one way in which the present invention provides for improved assembly of the head gimbal assembly into a parked position.

The present invention has the further advantage of being compatible for use with an improved way of assembling the HGAs onto the ramp during the manufacture and assembly of the disc drive. Referring to FIG. 5, a shipping comb tooth according to an invention disclosed in a co-pending patent application by the same inventor is shown. The shipping comb tooth can be brought into abutment with the distal end 54 of a corresponding ramp tooth of the present invention. In this manner, the HGA can be transferred smoothly from the shipping comb to the ramp. The ramp tooth may be modified to have first mating features 80 complementary to second mating features 82 on the abutment surface of the shipping comb tooth 74, and thus provides for self-alignment in the assembly process.

Alternatively, embodiments of the present invention may be described as follows:

A disc drive 10 contains at least one disc 12 and at least one head gimbal assembly 24 that is operably connected to an actuator 16. Extending from each head gimbal assembly 24 and away from the actuator 16 is a load beam 26. The disc drive 10 also includes a ramp 38 which has at least one ramp tooth 50. At least one surface 48 of each ramp tooth 50 is formed for abutment by a load beam 26. One of the ramp teeth 50 has a transition surface 66 which is between and adjacent to a proximal surface 68 and a distal surface 70. The distal surface 70 is defined as that which, in comparison with the proximal surface 68, is further away from the disc12. The transition surface 66 is configured to block the load beam 26 from moving from the proximal surface 68 to the distal surface 70.

The distal surface 70 may be at a different elevation from the proximal surface 68 such that the transition surface 66 forms a detent 62. The transition surface 66 may be further inclined to form an acute angled notch 72 with the proximal surface 68. In one embodiment, the transition surface 66 is made generally vertical. In another embodiment, the proximal surface 68 is inclined inwards of the ramp tooth towards the transition surface 66. Preferably, the proximal surface 68, the transition surface 66 and the distal surface 70 are part of a top surface 71 of the ramp tooth 50. In one aspect, the disc drive 10 may be used in conjunction with a shipping comb which has a number of shipping comb teeth 74 corresponding to the number of ramp teeth 50. Each ramp tooth 50 may include a distal end 54 configured for abutment with the corresponding shipping comb tooth 74. The distal end 54 may further include first mating features 80 complementary to second mating features 82 on the corresponding shipping comb tooth 74.

It is to be understood that the foregoing disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A disc drive comprising:
    at least one disc having an outer edge;
    an actuator;
    at least one head gimbal assembly operably connected to the actuator:
    at least one load beam, each one of the load beams extending from each one of the head gimbal assemblies away from the actuator; and
    a ramp located beside the outer edge of the at least one disc, the ramp comprising:
        at least one fixedly extending ramp tooth; and
        at least one surface of one of the ramp tooth configured for abutment by one of the load beams, wherein the surface comprises:
            a proximal surface;
            a distal surface, the distal surface being relatively further away from the at ;least one disc than the proximal surface; and a transition surface between and adjacent to the proximal surface and the distal surface, wherein the transition surface is configured to block the load bear from moving from the proximal surface to the distal surface.

2. A disc drive of claim 1 wherein the distal surface is at a different elevation from the proximal surface such that the transition surface forms a detent.

3. A disc drive of claim 2 wherein the transition surface is inclined to form an acute angled notch with the proximal surface.

4. A disc drive of claim 3 wherein the transition surface is generally vertical.

5. A disc drive of claim 4 wherein the proximal surface is inclined inwards of the ramp tooth towards the transition surface.

6. A disc drive of claim 1 wherein the surface is a top surface of the ramp tooth.

7. A disc drive of claim 1 for use in conjunction with a shipping comb having a corresponding number of shipping comb teeth, wherein each of the ramp teeth further comprises a distal end adjacent to the distal surface, and wherein the distal end is configured for abutment with the shipping comb teeth.

8. A disc drive of claim 7 wherein the distal end includes first mating features complementary to second mating features on the corresponding shipping comb tooth.

9. A ramp for parking a read/write head away from a disc surface in a disc drive, the ramp being adapted for assembly at an outer edge of the disc surface, wherein the read/write head is supported on a load beam, the ramp comprising at least one fixedly extending ramp tooth wherein the at least one ramp tooth comprises:

a proximal surface;

a distal surface, the distal surface being relatively further away from the disc surface than the proximal surface; and a transition surface between and adjacent to the proximal surface and the distal surface, the transition surface being configured to block the load beam from moving from the proximal surface to the distal surface.

10. A ramp of claim 9 wherein the distal surface is at a different elevation from the proximal surface such that the transition surface forms a detent.

11. A ramp of claim 10 wherein the transition surface is inclined to form an acute angled notch with the proximal surface.

12. A ramp of claim 11 wherein the transition surface is generally vertical.

13. A ramp of claim 12 wherein the proximal surface is inclined inwards of the ramp tooth towards the transition surface.

14. A ramp of claim 9 wherein the proximal surface, the transition surface and the distal surface are part of a top surface of the ramp tooth.

15. A ramp of claim 9 for use in conjunction with a shipping comb having a corresponding number of shipping comb teeth, wherein each of the ramp teeth further comprises a distal end adjacent to the distal surface, and wherein each one of the distal ends is configured for abutment with each of the shipping comb teeth.

16. A ramp of claim 15 wherein the distal end includes first mating features complementary to second mating features on the corresponding shipping comb tooth.

17. A disc drive comprising:

a disc having an outer edge;

a head gimbal assembly; and a ramp located at the outer edge of the disc for parking the head gimbal assembly off the disc, the ramp comprising means for keeping the head gimbal assembly from moving off the ramp away from the disc.

* * * * *